United States Patent [19]

Umetsu

[11] Patent Number: 4,627,803
[45] Date of Patent: Dec. 9, 1986

[54] APPARATUS FOR PRODUCING POLYACETYLENE FILM

[76] Inventor: Junichi Umetsu, No. 3-17, Kikusui 5-jo 2-chome, Shiroishi-ku, Sapporo, Japan

[21] Appl. No.: 646,228

[22] Filed: Aug. 31, 1984

[30] Foreign Application Priority Data

Aug. 31, 1983 [JP] Japan .......................... 58-134886[U]
Sep. 12, 1983 [JP] Japan .......................... 58-141186[U]

[51] Int. Cl.$^4$ ............................................... C08F 4/00
[52] U.S. Cl. ........................................ 425/6; 264/82; 422/136; 425/8
[58] Field of Search ............... 422/131, 135, 136, 209, 422/232; 425/8, 263, 6, 10, 402; 264/81, 82, 8, 2.1, 22

[56] References Cited

U.S. PATENT DOCUMENTS

| | | |
|---|---|---|
| 1,915,201 | 6/1933 | Ragg ........................... 425/8 |
| 3,297,406 | 1/1967 | Diefendorf ..................... 264/81 |
| 3,853,974 | 12/1974 | Reuschel et al. ................ 264/81 |
| 4,186,164 | 1/1980 | Spivack ........................ 264/81 |
| 4,408,972 | 10/1983 | Layfield ....................... 425/8 |

FOREIGN PATENT DOCUMENTS

| | | |
|---|---|---|
| 52-41689 | 3/1977 | Japan ........................ 422/136 |
| 56-48237 | 5/1981 | Japan ......................... 264/81 |
| 59-84902 | 5/1984 | Japan ........................ 422/135 |

Primary Examiner—Jay H. Woo
Assistant Examiner—J. Fortenberry
Attorney, Agent, or Firm—Schwartz, Jeffery, Schwaab, Mack, Blumenthal & Evans

[57] ABSTRACT

An apparatus for producing a polyacetylene film by introducing acetylene gas into a vessel for storing Ziegler-Natta catalyst to polymerize the acetylene gas with the catalyst which comprises a film forming projecting flat section having a film forming flat surface projected from the surface of the Ziegler-Natta catalyst stored in the bottom of the vessel, thereby coating the Ziegler-Natta catalyst on the inner surface of the side wall of the vessel and the film forming flat surface. Thus, the acetylene gas introduced into the vessel is polymerized with the catalyst to produce the polyacetylene film. In this manner, the polyacetylene film having a constant thickness of high quality can be produced with the Ziegler-Natta catalyst of the suitable amount by providing the film forming flat surface even in the bottom of the vessel, thereby improving the production efficiency.

11 Claims, 7 Drawing Figures

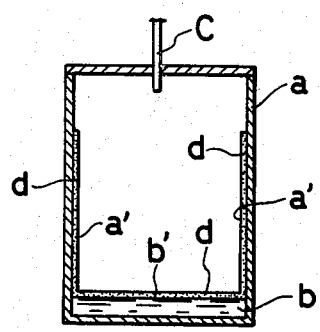
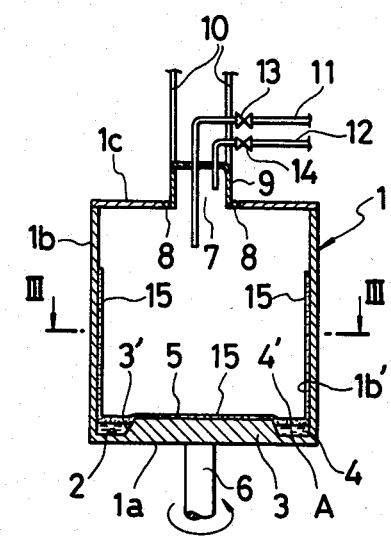
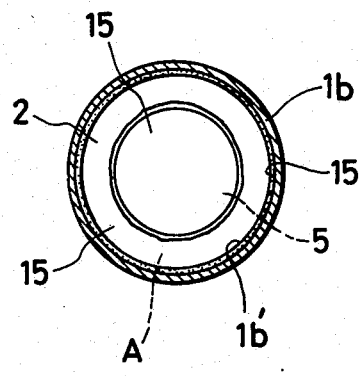

APPARATUS FOR PRODUCING POLYACETYLENE FILM

BACKGROUND OF THE INVENTION

This invention relates to an apparatus for producing a polyacetylene film.

A polyacetylene is the most simple chain conjugated high-molecular compound which contains as ingredients a carbon atom and a hydrogen atom, and has properties as a semiconductor. Particularly, a polyacetylene membrane which is laminated with Ziegler-Natta catalyst ($Ti(OC_4H_9)_4$—$Al(C_2H_5)_3$ series) has fibril (fibrous ultrafine crystal) mesh structure of approximately 200 Å in diameter.

When this membrane is slightly doped with halogen gas or arsenic pentafluoride, its conductivity can be varied over a wide range.

Since such a polyacetylene membrane has excellent chemical stability, a light weight and a fibril mesh structure resulting in a large surface area, it has heretofore been recognized as a suitable electrode material for a secondary battery.

In order to heretofore produce the above-described polyacetylene film, Ziegler-Natta b is stored in a cylindrical vessel a, the vessel a is fluctuated to adhere the catalyst b to the inner wall surface a' of the vessel a, acetylene gas is introduced from the supply tube c into the vessel a, thereby forming a polyacetylene film d obtained by the polymerization of the gas over the boundary between the vapor phase and the liquid phase of the catalyst b stored in the bottom of the vessel a from the catalyst b adhered to the inner wall surface a'.

In the conventional case, the polyacetylene film d produced on the surface b' in the catalyst b in the bottom is impregnated with a large quantity of catalyst in the fibril mesh structure. Accordingly, the quality is deteriorated, and only the polyacetylene film d produced on the inner wall surface a' can be utilized as a material for the electrode of a secondary battery. The result is that the production efficiency is low, and the catalyst b adhered to the peripheral surface a' tends to flow down toward the bottom surface even in the polyacetylene film d of the inner wall surface. Thus, the bottom side becomes thick, resulting in an undesirable irregular thickness.

SUMMARY OF THE INVENTION

Accordingly, it is an object of this invention to provide an apparatus for producing a polyacetylene film which can eliminate the aforementioned drawbacks and disadvantages and can improve the production efficiency of the polyacetylene film, and can produce the polyacetylene film having uniform thickness.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIG. 1 is a schematic vertical sectional front view showing a conventional apparatus for producing a polyacetylene film;

FIG. 2 is a vertical sectional front view of an embodiment of an apparatus for producing a polyacetylene film according to the present invention;

FIG. 3 is a sectional view taken along the line III—III in FIG. 2 as seen from arrows;

DESCRIPTION OF THE PREFERRED EMBODIMENTS

Figure 4:
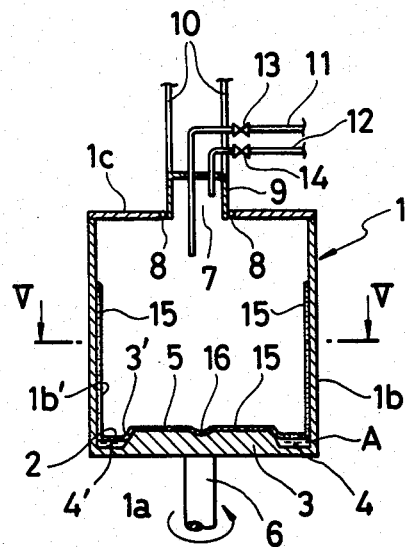
FIG. 4 is a vertical sectional front view of another embodiment of an apparatus for producing a polyacetylene film in the used state according to the present invention.
Figure 5:
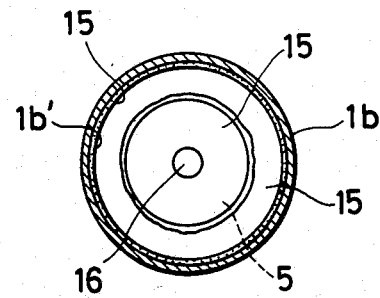
FIG. 5 is a sectional view taken along the line V—V in FIG. 4 as seen from arrows.

The present invention will now be described in more detail with reference to the accompanying drawings.

In FIGS. 2 and 3, reference numeral 1 designates a vessel formed in a covered cylindrical shape. An outer peripheral bottom 2 and a disc-shaped film forming projecting flat section 3 projected from the center are formed in the bottom wall 1a of the vessel 1. The bottom 2 and the flat section 3 are concentrically arranged with the side wall 1b of the vessel 1 as shown in FIG. 3, Ziegler-Natta catalyst 4 in a liquid state is stored in a recess A surrounded by the bottom 2, the side 3' of the flat section 3 and the inner surface 1b' of the side wall 1b, and a film forming flat surface 5 formed on the upper end of the flat section 3 is projected from the surface 4' of the catalyst 4.

A rotational shaft 6 rotatably driven by a drive device, not shown, is fixedly secured to the center on the back surface of the bottom wall 1a of the vessel 1 so that the vessel 1 is rotatable. However, the vessel 1 may be formed to be rockably supported by a suitable device without rotating the vessel 1.

An opening 7 of circular shape is formed at the center of the ceiling wall 1c of the vessel 1. The upper end of the vessel 1 is supported rotatably to a cup-shaped supporting member 9 through an O-ring 8 interposed in the opening 7 in an airtight manner.

Reference numeral 10 designates an arm lever for fixedly securing the supporting member 9.

A conduit 11 for introducing acetylene gas, connected to a supply source, not shown, and an exhaust conduit 12 are opened through the vessel 1 at the supporting member 9, and control valves 13, 14 are respectively provided at the conduits 11 and 12 for maintaining the acetylene gas atmosphere under a predetermined constant pressure.

In operation for producing the polyacetylene film by using the apparatus thus constructed as described above, the vessel 1 is rotated by the shaft 6, the Ziegler-Natta catalyst 4 is coated on the inner surface 1b' of the side wall 1b of the vessel 1. In this case, a small amount of the catalyst 4 is coated in advance on the film forming flat surface 5.

Then, the rotating shaft 6 is stopped, acetylene gas is introduced through a conduit 11 into the vessel 1, thereby polymerizing the acetylene gas with the Ziegler-Natta catalyst 4 coated on the inner surface 1b' of the side wall 1b and on the film forming flat surface 5 to produce the polyacetylene film 15.

In the second embodiment of an apparatus for producing a polyacetylene film according to the present invention as shown in FIGS. 4 to 7, the fundamental structure is the same as that in the first embodiment shown in FIGS. 2 and 3, wherein the same reference numeral indicate the same or corresponding parts, except the point that a storage recess 16 for storing Ziegler-Natta 4 is formed at least part of the film forming surface 5 formed on the upper end of the above-described film forming projecting flat surface 3.

Figure 6:
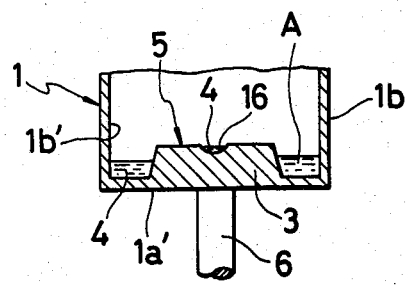
FIG. 6 is a partial vertical sectional front view of the unused state showing the essential part of the embodiment.
Figure 7:
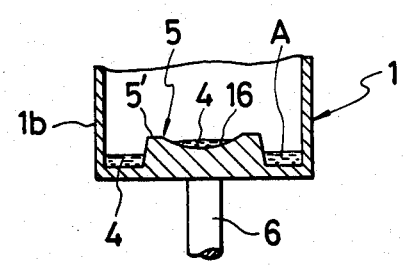
FIG. 7 is a partial vertical sectional front view of the unused state of the other embodiment.

In the embodiment shown in FIG. 6, a spherical small storage recess 16 is formed at the center on the flat film forming surface 5, and the catalyst 4 is stored in the recess 16. On the other hand, in the embodiment shown in FIG. 7, the storage recess 16 formed on the film forming surface 5 is increased over that in FIG. 6. A spherical storage recess 16 is formed substantially in a shallow depth except for the small flat part 5' around the film forming surface 5. Thus, the catalyst 4 can be coated on the entire surface of the film forming surface 5 without irregularity.

In operation for producing the polyacetylene film with the apparatus thus constructed as described above, the Ziegler-Natta catalyst 4 is stored in advance in the recess A and the storage recess 16 of the vessel 1. The vessel 1 is then rotated by the shaft 6, thereby coating the catalyst 4 on the inner surface 1b' of the side wall and the film forming surface 5. In this case, the excessive catalyst 4 stored in the recess 16 flows down to the recess A from the outer periphery of the film forming surface 5.

Then, the rotating shaft 6 is stopped, acetylene gas is introduced into the vessel 1 from the conduit 12 under a predetermined constant pressure as described above, thereby polymerizing the acetylene gas with the Ziegler-Natta catalyst 4 coated on the inner surface 1b' of the side wall and the film forming flat surface 5 to produce the polyacetylene film 15.

According to the first embodiment of the present invention as described above, there is an apparatus for producing a polyacetylene film by introducing acetylene gas into a vessel 1 for storing Ziegler-Natta catalyst 4 to polymerize the acetylene gas with the catalyst 4 which comprises a film forming projecting flat section 3 having a film forming flat surface 5 projected from the surface 4' of the Ziegler-Natta catalyst 4 stored in the bottom of the vessel 1, thereby coating the Ziegler-Natta catalyst 4 on the inner surface 1b' of the side wall of the vessel 1 and the film forming flat surface 5. Thus, the acetylene gas introduced into the vessel 1 is polymerized with the catalyst 4 to produce the polyacetylene film 15. In this manner, the polyacetylene film 15 having a constant thickness of high quality can be produced with the Ziegler-Natta catalyst 4 of the suitable amount by providing the film forming flat surface 5 even in the bottom of the vessel 1, thereby improving the production efficiency. When the vessel 1 is rotated to coat the catalyst 4 on the inner surface 1b' of the side wall, a layer of the catalyst 4 of the uniform thickness can be coated on the inner surface 1b', and a polyacetylene film 15 having a high quality and the prescribed constant thickness can be produced even on the inner surface 1b' of the same side wall.

Further, according to the second embodiment of the present invention, an apparatus for producing a polyacetylene film provides for introducing acetylene gas into a vessel 1 for storing Ziegler-Natta catalyst 4 to polymerize the acetylene gas with the catalyst 4, in which a film forming projecting flat section 3 has a film forming flat surface 5 projected from the surface 4' of the Ziegler-Natta catalyst 4 stored in the bottom of the vessel 1 in the same manner as the first embodiment, and further has a storage recess 6 formed along at least a part of the film forming surface 5 for storing the Ziegler-Natta catalyst 4. The Ziegler-Natta catalyst 4 is thereby coated on the inner surface 1b' of the side wall of the vessel 1 and the film forming flat surface 5 by rotating the vesses 1. Thus, this second embodiment can not only perform the same advantages as the first embodiment, but also the catalyst 4 can be stored in advance in the storage recess 16, and the catalyst 4 does not flow out unintentionally from the film forming surface 5 to the recess A. The catalyst 4 also flows out in a uniform thickness on the film forming surface 5 including the recess 16 by the rotation of the vessel 1, thereby consistently forming a polyacetylene film of high quality.

What is claimed is:

1. An apparatus for the catalytic film polymerization of a gaseous monomer, comprising:
    (a) a polymerization vessel having an interior surface defining a sidewall portion and a bottom portion;
    (b) means for retaining a quantity of liquid catalyst in said bottom portion along a perimeter area of said bottom portion;
    (c) a raised portion projecting from a central area of said bottom portion and having an upper surface extending from a liquid surface of said liquid catalyst;
    (d) means for feeding a monomer gas to said vessel;
    (e) means for coating said catalyst along said interior surface and said upper surface of said raised portion, forming thereby a catalyst film, said monomer gas being polymerized in the presence of said catalyst to produce a polymer film of uniform thickness along said interior surface and said upper surface of said raised portion.

2. The apparatus according to claim 1, wherein said upper surface of said raised portion is flat and horizontal.

3. The apparatus according to claim 2, wherein said coating means includes means for rocking said polymerization vessel.

4. The apparatus according to claim 2, wherein said coating means includes means for coating said flat horizontal upper surface prior to coating said interior surface.

5. The apparatus according to claim 1, wherein said upper surface of said raised portion includes a storage recess.

6. The apparatus according to claim 5, wherein said storage recess is located at a center of said upper surface.

7. The apparatus according to claim 5, wherein said storage recess comprises a shallow depression occupying all of said upper surface of said raised portion except for a flat perimeter of said upper surface.

8. The apparatus according to claim 1, wherein said coating means includes means for rotating said polymerization vessel.

9. The apparatus according to claim 8, wherein said polymerization vessel includes an opening rotatably sealed by a supporting member.

10. The apparatus according to claim 9, wherein said monomer gas feeding means includes inlet and outlet conduits in said supporting member for maintaining a constant pressure of monomer gas in said polymerization vessel.

11. The apparatus according to claim 1, wherein said monomer gas is acetylene and said catalyst is a Ziegler-Natta catalyst.

* * * * *